United States Patent [19]
Williams et al.

[11] Patent Number: 5,868,804
[45] Date of Patent: Feb. 9, 1999

[54] ARTIFICIAL FIRELOG WITH NATURAL WOOD SOUND

[75] Inventors: John W. Williams, Oak Lawn; Timothy L. LaRocque, Oak Forest; Robert W. Fraser, Lombard; Robert T. Dorsey, Orland Park, all of Ill.

[73] Assignee: First Brands Corporation, Danbury, Conn.

[21] Appl. No.: 18,398

[22] Filed: Feb. 4, 1998

[51] Int. Cl.⁶ ........................................ C10L 5/36
[52] U.S. Cl. ................ 44/535; 44/541; 44/544; 44/572; 44/590
[58] Field of Search .............................. 44/535, 541, 572, 44/544, 590

[56] References Cited

U.S. PATENT DOCUMENTS

| | | | |
|---|---|---|---|
| 3,297,419 | 1/1967 | Eyre, Jr. | 44/535 |
| 3,843,336 | 10/1974 | Messman | 44/535 |
| 4,043,765 | 8/1977 | Tanner | 44/535 |
| 4,169,709 | 10/1979 | Stima | 44/535 |
| 4,478,601 | 10/1984 | Stephens | 44/544 |
| 4,810,256 | 3/1989 | Fay, III et al. | 44/541 |
| 4,834,774 | 5/1989 | Fay, III et al. | 44/532 |
| 5,118,539 | 6/1992 | Sibby et al. | 44/535 |
| 5,656,312 | 8/1997 | Erasmas et al. | 426/89 |

*Primary Examiner*—Jacqueline V. Howard
*Attorney, Agent, or Firm*—Gary L. Wamer

[57] ABSTRACT

The artificial firelogs of this invention provide a natural visual and audible sensation so that the artificial firelogs have both a soothing flickering flame and a crackling or popping sound normally observed only with natural wood logs. The crackling additive can be mustard seeds, sesame seeds and synthetic hollow spheres.

32 Claims, No Drawings

ARTIFICIAL FIRELOG WITH NATURAL WOOD SOUND

TECHNICAL FIELD

This invention relates to an artificial firelog containing an additive that provides a crackling or popping sound that mimics the crackling sound associated with burning natural wood.

BACKGROUND INFORMATION

Various types of artificial firelogs are known and have been formulated to act as a substitute for natural firewood and are designed for use in fireplaces and other environments where natural wood would otherwise be used. Typically, artificial firelogs are made by mixing flammable particles with a binder matrix to form a mixture and then molding or extruding the mixture into an elongated form that resembles a piece of natural wood. Wood particles and other cellulosic-derived materials are readily available and are therefore often used as the flammable particles. A commonly used type of wood particle is saw dust of selected sizes and of various wood types and can be employed in various particle size distributions. Various types of inexpensive waxes, resins, plant extracts and related petroleum derived products are often used as the binders for the particles in the artificial firelogs.

The binder functions to hold the firelog in a desired shape and aids in the combustion process, since it commonly has provides most of the firelog's fuel value during the combustion of the firelog in a fireplace or other suitable combustion location.

Generally, artificial firelogs are formed by extruding the mixture through a bore extrusion die wherein the particles and binder as well as any other materials incorporated therein are compressed and shaped within the extrusion bore. The extruded product is cut into predetermined lengths that are sized to fit in a home fireplace or other combustion site and provide a predictable burn time of typically 2 to 4 hours. The elongated flammable bodies (also know as artificial firelogs) formed by this process are usually placed in a protective outer wrapper or sheath for sale, although this is optional and depends on the aesthetics of sale and the materials selected to form the artificial firelogs.

These firelogs are typically marketed for sale to residential homeowners for use in a home fireplace to provide heat and to provide an attractive fire that simulates the fire produced by a natural wood fire. In order to provide advantages over a natural wood fire, the artificial firelogs are formulated so that they can burn for a few hours without attending to the fire as would be required when burning natural wood. Also, artificial firelogs generally start much easier, burn cleaner and generate less ash compared to natural wood. In order to make use of the artificial fuel log more attractive than use of natural wood, the firelog usually includes means for rapidly igniting it with a match which is applied to the outer wrapper. Further, since the artificial firelog is in many instances being used for the aesthetic enjoyment of a fire in social settings, any attributes that are similar to a traditional wood fire will enhance the pleasure of the products use and more closely simulate a traditional wood fire.

Various types of coverings or coatings have been suggested for use in fuel articles. These coatings or coverings address the need to provide a low cost means for reducing adherence of the wrapper to the firelog.

U.S. Pat. No. 5,118,539 discloses a firelog grating system and discloses use therewith of artificial firelogs containing hemp, millet and sunflower seeds as additives in the firelog. The patentee states at Column 5, lines 7 et seq. that, "Although the use of a typical fuel log 18 is sufficient to generate the desired effect for flame quality, it has been found that by impregnating such fuel log with a variety of seed 24 such as hemp, millet, and sunflower, those commonly found in birdseed, a popping sound is generated much like that which a burning log makes as the moisture in the log is heated and ignites. This popping sound adds to the atmosphere created to make the use of the present invention less distinguishable from a wood burning fire." Although these seeds may provide some modest sound, the disclosed seeds do not provide an effective sound. Testing of various grades of millet and sunflower seeds have shown they do not pop sufficiently well to provide a popping sound and their sounds are very short-lived. Further, hemp seeds are illegal to possess and, accordingly cannot be used as a firelog additive.

SUMMARY OF THE INVENTION

The instant invention is related to a recognition that certain naturally occurring seeds and hollow synthetic granules provide unique crackling sounds when added to artificial firelog. In one embodiment of this invention to provide an artificial firelog having a audible popping characteristic achieved by adding a crackling additive selected from the group consisting of: 1) at least one seed selected from the group of mustard, flax, cumin and sesame seeds; and 2) hollow synthetic granules; and 3) mixtures of 1) and 2). Further, the instant invention also relates in one embodiment to the use of a hollow synthetic granules that provides for a surprising audible characteristic which are similar to the crackling sound generated by natural wood.

In another embodiment of this invention an artificial firelog is provided having audible crackling characteristics of reasonable duration by adding an effective amount of a stabilization agent for the crackling additive whereby the crackling additive is stabilized during the burning of the firelog.

In another embodiment of this invention an artificial firelog is provided having audible crackling characteristics of reasonable duration by selecting the distribution of the crackling additive in the firelog extrudate to selectively distribute the crackling additive in the firelog whereby the crackling duration is correlated to the distribution and/or use of a stabilization agent.

The firelog of this invention has the conventional elongated configuration that typifies artificial firelogs presently available. Firelogs made by extrusion or other molding processes are preferably enclosed within a conventional combustible flexible wrapper of paper or coated paper. Such elongated firelogs are substantially straight bodies having a circular or rectangular (especially square) cross-sectional configuration with a longitudinal axis extending from one end to the other. The firelogs of the present invention have this same type of general configuration, but can be extruded in any shape pleasing to consumers, for example, triangular, trapezoidal, arcuate, octagonal or other selected geometric shape.

DETAILED DESCRIPTION OF THE INVENTION AND SPECIFIC EMBODIMENTS

The artificial firelogs of this invention are preferably made from wood particles including wood and other cellulosic materials, preferably sawdust or wood particles, and a binder. Representative materials include wood particles of all conventional woods (oak, cedar, pine and others), coal particles, cardboard, waxed cardboard, particle boards, peanut shells, corn husks, other commonly available particulate cellulosic materials. The binder can be conventional firelog waxes such as slack wax and paraffin waxes or combinations thereof, footes oil and other generally available binders. Representative of the cellulosic or carbon-based materials and binder materials heretofore found to be suitable for use in artificial firelogs include those disclosed in U.S. Pat. Nos.: 4,040,796, 4,883,498, 4,104,034. 4,043,765, 4,326,854, 4,042,343, 3,973,922 and 3,297,419; said patents being incorporated herein by reference thereto.

The artificial firelogs of this invention provide a natural visual and audible sensation in that the artificial firelogs have both a natural soothing flame and a crackling or popping sound from the crackling additive similar to that normally observed only with natural wood logs. The instant invention disclosed herein creates a sound characteristically soothing and similar to the crackling sounds commonly experienced with a natural wood fire. The audible sensation is achieved by adding a crackling additive selected from the group consisting of: 1) at least one seed selected from the group of mustard, flax, cumin and sesame seeds; 2) hollow synthetic granules, such as ceramic, glass or polymeric spheres; and 3) mixtures of 1) and 2).

The amount of the crackling additive is related to the desired incidence of the crackling or popping sensation that one desires to generate and to the selected crackling additive, but is provided in an effective crackling amount to enable the user of the artificial firelog to clearly hear the crackling or popping sound as the firelog burns. The crackling additive may be present in an effective crackling amount, based on the total weight of the firelog, of between about 0.10 weight percent and 10 weight percent (wt. %), and it has been observed that firelogs containing between about 0.25 wt. % and about 8 wt. % provide effective crackling sounds. It's possible to use lower and higher amounts of the crackling additive, although higher percents are costly, abrasive and probably don't bind well and lower percents become hard to detect audibly the crackling sound. For the generation of the crackling effect and cost reasons, the crackling additive is typically present in an effective amount of between about 1 weight percent and about 3 weight percent, based upon the total weight of the artificial firelog. The remainder of the firelog is typically sawdust, such as oak or cedar, and a binder, such as paraffin wax, slack wax and footes oil or other commonly employed binder. When the crackling additive is mustard seed it is preferably used in an effective amount, based on the total weight of the firelog, of between about 0.10 weight percent and 8 weight and is typically present in an amount of between about 1 weight percent and 3 weight percent. When the crackling additive comprises hollow synthetic spheres, such as ceramic, glass or polymeric (e.g. plastic or other materials) spheres, the effective crackling amount, based on the total weight of the firelog, is an effective amount preferably between about 0.5 weight percent and 5 weight percent and is typically present in an effective crackling amount of between about 0.5 weight percent and about 3 weight percent.

The selection of the seeds which may be used as the crackling additive is related to the ability of the seed to withstand some heat before having the outer seed shell deteriorate and the propensity of the seed to burst in sudden release of inner pressure from the generation of gases from internal water, oils and other vaporizable components. It has been observed that mustard, flax, cumin and sesame seeds have an unexpected ability to withstand the intense heat of a burning firelog and still maintain a strong outer shell that permits the sudden release of internal pressure with the coincident generation of a sound. Other seeds, such as sunflower seeds and millet, simply burn or tend to rupture prematurely without significant coincident generation and duration of a sound. Seeds that have been found to unexpectedly to provide an improved crackling sound include mustard, flax, cumin and sesame seeds. These seeds are characterized by a generally round or oval, seamless shape. High-grade mustard seeds have been measured to resist rupture in excess of 3 pounds per seed.

The synthetic hollow spheres or granular materials, such as glass, ceramic or polymeric spheres, which are suitable for use in this invention, include hollow materials found in the prior art and commonly used in cosmetic and other applications as abrasives and fillers for bowling balls and paints. Owing to the production methods for hollow synthetic materials, such materials tend to be generally spherical in shape, although the shape can be other than spherical if the synthetic granules are hollow. One such hollow ceramic sphere is commercially available from the 3M subsidiary Zeelan Industries, Inc of St. Paul Minn. under the trade name Z-LIGHT Spheres ceramic microspheres. These ceramic microspheres are available in various forms and are characterized as having thermal stability (softening temperature of 2200 degrees Fahrenheit) and high surface area. These ceramic spheres are generally sold with air with low moisture content in the hollow volume of the sphere, although one can envision that the ceramic spheres can be filled with fragrance, an ignitable gas or solid that enhances the crackling sound, a color generating chemical, water or other chemical to provide a characteristic to the log when it burns. One particularly useful class of ceramic microspheres is commercially available as Z-Light spheres W-1300 and is characterized as being hollow spheres with thin wall, a silica-alumina ceramic, a specific gravity of 0.7, a compressive strength of approximately 5000 psi (pound per square inch), softening temperature of 1100 degrees Fahrenheit, thermal conductivity of 0.09 watts per meter per degree Centigrade, coefficient of thermal expansion d of $8 \times 10^{-5}$, dielectric constant of 1.608 at 1000KH and a specific are of 0.08 square meters per cubic centimeter and an average particle diameter of 125 microns. Z-LIGHT spheres W-1800 are similar in form and other parameters to W-1300 but are characterized by a larger average particle diameter of about 265 microns. It has been observed that W-1300 W-1800 act as a crackling additives in a way that is markedly different from natural seeds. W-1300 W-1800 have the ability to sustain generation of a crackling sound that is uncharacteristic of natural seeds. The thermal stability and high compressive strength of this ceramic microspheres is believed to be useful in stabilizing the prolonged crackling sound observed by artificial firelogs containing Z-LIGHT spheres. W-1300 and W-1800 are generally present in an effective amount between about 1 and about 3 weight percent, based on the total weight of sawdust, binder and hollow ceramic microspheres.

One of the unique aspects of the instant invention is the use of the crackling additive selectively in different portions of the firelog. Since an artificial firelog is an extruded article it can be co-extruded in two or more layers and the crackling additive can be selectively added to any layer and can be added in different concentrations. In one embodiment of this invention an artificial firelog is provided having audible crackling characteristics of reasonable duration by selecting the distribution of the crackling additive in the firelog to selectively distribute the crackling additive in the firelog whereby the crackling duration is selected. In this embodiment the crackling additive is added to an inner layer space inwardly from the initial outer ignition surface of the firelog. In this embodiment the crackling additive is initially protected from the ignition flame of the firelog surface where the use of a paper ignition wrap or the coating of a flame propagation ignition source, such as a paraffin wax may exaggerate the temperature.

In another embodiment of this invention an artificial firelog is provided having audible crackling characteristics of reasonable duration by adding an effective amount of a crackling additive stabilization or control agent to stabilize the crackling additive whereby the sound profile of the popping additive is stabilized during the burning of the firelog. In this embodiment the firelog contains a crackling additive with a crackling additive stabilization agent to stabilize the crackling additives' propensity to burn in the presence of an ignited firelog. The crackling additive control agent acts as a stabilization component for the crackling additive by providing an effective cooling effect to retard the premature rupturing of the crackling additive. The stabilization agent also has been observed to lengthen the bring time of the artificial firelogs to which it is added. The stabilization agent may be present in an effective control amount of between about 2 weight percent and 30 weight percent and is typically present in an amount of between about 5 weight percent and 20 weight percent, based on the total weight of the firelog. Representative crackling stabilization agents include various types of green woods, such as oak, cedar and pine, having a water content of between 20 and 40 weight percent water and can be employed in an amount between about 2 weight percent and about 50 weight percent, based on the total weight of the artificial firelog.

In general there is no specific criticality with respect to the relative amounts of sawdust and binder utilized and the crackling additives, although the selection of these components should be correlated to the selection of the crackling additive, since such selections affect the temperature profiles which the crackling additive will experience during the burning of the firelog. In general these ingredients are used in conventional amounts for effective binding of the wood particles and binder so that the extruded firelog body retains its shape. Artificial firelogs typically contain from between about 30 to 70 weight percent of a sawdust or binder, preferably between about 40 and about 60 weight percent of the sawdust or binder, with the crackling additives generally being present in an amount between about 1 to about 10 percent by weight. The conventional binders that are utilized in artificial firelogs tend to be relatively soft so that the firelog is not brittle and is thus resistant to breaking during handling and storage. The soft non-brittle binders are also preferred because they are inexpensive and have adequate combustion characteristics to sustain a fire once the firelog is burning. However, such soft binders do not ignite as readily as the more brittle and more costly paraffin wax binders that are currently available. Cost considerations generally preclude the use of such paraffin wax binders at least as a major component of the firelog body, although such can be employed as a major component or as a coating on the outer surface of the firelog. Also paraffin wax is avoided as the only binder component of the binder because of its general brittle nature and higher cost as compared to other binders such as slack wax and footes oil.

As noted above, in addition to the use of a binder component, a wax coating or ignition strip may be applied to improve the ignition and lighting of the artificial firelog by any of the usual coating methods for wax, including spraying, dipping, brushing, etc., and by co-extrusion as an outer layer with the sawdust and binder composition as the core. There is no known criticality with respect to the coating thickness. However, due to the high cost of paraffin wax, it is preferred to apply the coating in a very thin layer that is effective to reduce the surface tackiness of the firelog body and to enhance lighting. U.S. Pat. Nos. 5,347,950 and 5,488,930, incorporated herein by reference thereto, disclose suitable wax coating processes for use herein.

The following examples are provided to demonstrate the invention and are not deemed to be limiting thereof:

EXAMPLES

Example 1

Firelogs were prepared using 48 wt % of an oak sawdust characterized by a typical particle size of 500 microns and using a binder of 52 wt % of a wax blend consisting of 70% Bareco RP1003 footes oil and 30% Astor 5030 log wax. The firelog was extruded to have an overall substantially square cross section, dimensions of 3.625"×3.625" and an weight of 5 lbs. having a length of 10.625" with 4 rectangular shaped notches placed in the middle of each face. To this firelog compositional base material were added one of the following crackling additives of: 1) 3 wt. % of #1 grade Canadian mustard seed, 2) 2 wt. % of hollow ceramic spheres (Z-LIGHT W-1800), 3) 3 wt. % sesame seeds, 4) 3 wt. % flax, and 5) 3 wt. % cumin. Comparative firelogs were prepared using the following seeds: 1) 3 wt. % sunflower; and 2) 3 wt. % white millet. These comparative logs demonstrated that not all seeds provide an audible characteristic when added to an artificial firelog composed of saw dust and wax binders.

Each firelog was burned in a Majestic MBU36 fireplace under substantially the same burning conditions in this UL listed fireplace. The test analyst made observations for each firelog and the firelog rated on a scale of sounds observed as an indication of the crackling quality of the additive. In addition, observations were made on the integrity during the burn, magnitude of the physical popping parameter and the length of time of the audible sensation for each of the firelogs.

The results of the burn test for each firelog were as follows:

TABLE 1

| (Time of last sound from start of burn—Hours:Minutes) | | |
|---|---|---|
| Additive | Last loud "pop"* | Last soft "poof"* |
| Mustard | 2:00 | 2:15 |
| W-1800 | 3:15 | 3:30** |
| Sesame | 2:00 | 2:15 |
| Flax | 0:45 | 1:15 |
| Cumin | 0:45 | 1:00 |
| Sunflower | 0:15 | 0:15 |
| White millet | 0:15 | 0:30 |

*A "poof" is an audibly perceivable sound, but it is not as pronounced as the pop.
**W-1800 is similar to W-1300 but has an average particle size of 265 microns.

Example 2

Firelogs were extruded as described in Example 1 using 0 wt. % and 50 % by weight green wood particles substituted for sawdust, based upon the total wood present. The green wood was characterized as having a moisture content of 26 weight percent and by physically mixing in the 3 wt. % of#1 grade Canadian mustard seed and the green wood with the dried wood particles and the binder material prior to extrusion of the firelog. It was observed that the crackling mustard seed additive continued to make loud sounds for about twice as long, 2 hours versus 1 hour, in a log with 50 wt. % green wood as compared to a firelog without 0 wt. % green wood. It was also observed that the burn time of the log was extended by 40 minutes to 4 hours by the addition of 50 wt. % green wood.

Example 3

Firelogs were extruded using a well-mixed batch of 50% Bareco RP1003 footes oil wax, 48 wt. % oak sawdust and 2 wt. % W-1300 Z-LIGHT ceramic spheres. It was observed that these logs made pleasant crackling sounds for their entire burn of 3 hours. This run was then repeated with the same results.

We claim:

1. An artificial firelog comprising combustible particles bound together in a combustible binder and a crackling additive present in an effective crackling amount to provide an audible crackling sound during the burning of the firelog wherein the crackling additive is selected from the group consisting of: 1) at least one seed selected from the group of mustard, flax, cumin and sesame seed; 2) hollow synthetic spheres; and 3) mixtures of 1) and 2).

2. The firelog of claim 1 wherein the effective amount of the crackling additive is between about 0.1 weight percent and about 10 weight percent.

3. The firelog of claim 1 wherein said combustible particles are selected from the group consisting of wood particles, coal particles, ground cardboard, waxed cardboard and ground paper and said binder comprises at least one of paraffin wax, slack wax, footes oil and mixtures thereof.

4. The firelog of claim 3 wherein the wood particles are present in an amount between about 30 and about 70 weight percent and the binder is present in an amount between about 30 and about 70 weight percent.

5. The firelog of claim 1 wherein said audible crackling additive is at least one seed selected from the group consisting of mustard seed, flax, cumin and sesame.

6. The firelog of claim 1 wherein said audible crackling additive is at least one synthetic hollow sphere selected from the group of ceramic spheres, glass spheres and polymeric spheres.

7. The firelog of claim 6 wherein said hollow sphere contains at least one of dry air, air with water vapor, fragrance, ignitable component and colorant.

8. The firelog of claim 1 which further comprises a wax coating somewhere on said body wherein said coating has a lower flash point relative to said binder.

9. The firelog of claim 1 that is wrapped in a flexible combustible wrapper that encloses said body.

10. The artificial firelog of claim 1 wherein said firelog contains an effective amount of a stabilization component for the audible crackling additive to increase the time the crackling additive provides a crackling sound as compared to when said stabilization component is not present in the artificial firelog.

11. The firelog of claim 10 where in the stabilization component is selected from the group consisting of green woods containing up to 50 weight percent water.

12. The firelog of claim 10 where in the effective amount of the stabilization component for said crackling additive is between about 2 weight percent and about 50 weight percent.

13. The firelog of claim 1 wherein said concentration of said crackling additive is selectively distributed in said firelog inwardly from the outer surface to improve the crackling characteristics of the crackling additive during the burning of the firelog.

14. The firelog of claim 13 wherein said distribution of the crackling additive is characterized by a lower concentration at the outer surface of the firelog than on the inside of the firelog.

15. An artificial firelog according to claim 1 comprising of combustible sawdust particles bound together in a combustible binder matrix, a hollow synthetic granular additive present in an effective crackling amount to provide an audible sound during the burning of the firelog.

16. The artificial firelog of claim 15 wherein said crackling hollow synthetic sphere additive is selected from the group consisting of hollow glass spheres, hollow ceramic spheres, hollow polymeric spheres and mixtures thereof.

17. The firelog of claim 15 wherein the effective amount of the crackling additive is between about 0.5 weight percent and about 8 weight percent.

18. The firelog of claim 1 wherein said combustible particles are wood particles and said binder comprises at least one of paraffin wax, slack wax, footes oil and mixtures thereof.

19. The firelog of claim 18 wherein the wood particles are present in an amount between about 30 and about 70 weight percent and the binder is present in an amount between about 30 and about 70 weight percent.

20. The firelog of claim 1 wherein said crackling additive is a ceramic hollow sphere.

21. The firelog of claim 15 wherein said crackling additive is at least one hollow spheres selected from the group of glass spheres or polymeric spheres.

22. The firelog of claim 16 wherein said hollow sphere contains at least one of dry air, air with water vapor, fragrance, ignitable component and colorant.

23. The firelog of claim 15 that is wrapped in a flexible combustible wrapper that encloses said body.

24. The artificial firelog of claim 15 wherein said firelog contains an effective amount of a stabilization component for the audible crackling additive to increase the time the crackling additive provides a crackling sound as compared to when said stabilization component is not present in the artificial firelog.

25. The firelog of claim 24 where in the stabilization component is selected from the group consisting of green wood containing up to 50 weight percent water.

26. The firelog of claim 25 where in the effective amount of the stabilization component for said crackling additive is between about 5 weight percent and about 50 weight percent.

27. The firelog of claim 25 wherein of said crackling additive is selectively distributed in said firelog inwardly from the outer surface to improve the crackling characteristics of the crackling additive during the burning of the firelog.

28. An artificial firelog according to claim 1 comprising combustible wood particles bound together in a combustible binder matrix, and a crackling hollow ceramic sphere additive present in an effective crackling amount of between about 0.10 weight percent and 10 weight percent to provide an audible sound during the burning of the firelog.

29. An artificial firelog according to claim 28 wherein said ceramic hollow sphere is a silica-alumina ceramic, has a specific gravity of about 0.7, has a compressive strength of about 5000 pound per square inch, has a softening temperature of about 1100 degrees Fahrenheit, has a thermal conductivity of about 0.09 watts per meter per degree Centigrade, has a coefficient of thermal expansion of about 8×10–5, has a dielectric constant of about 1.608 at 1000 KH and has a specific area of about 0.08 square meters per cubic.

30. The firelog of claim 28 wherein the effective amount of the crackling additive is between about 0.5 weight percent and about 8 weight percent.

31. The firelog of claim 28 wherein said cellulosic particles are wood particles and said binder comprises at least one of paraffin wax, slack wax, footes oil and mixtures thereof.

32. The firelog of claim 28 wherein the wood particles are present in an amount between about 40 and about 60 weight percent and the binder is present in an amount between about 40 and about 60 weight percent.

* * * * *